US012662942B2

(12) United States Patent
Aschermann et al.

(10) Patent No.: US 12,662,942 B2
(45) Date of Patent: Jun. 23, 2026

(54) REPAIR METHOD FOR TURBINE BLADES

(71) Applicant: MTU Aero Engines AG, Munich (DE)

(72) Inventors: Lars Aschermann, Peine (DE);
Bastian Mania, Hannover (DE);
Alexandre Minso, Hannover (DE);
Frank Seidel, Grossburgwedel (DE);
Matthias Wagner, Buchholz-Trelde
(DE)

(73) Assignee: MTU Aero Engines AG, Munich (DE)

( * ) Notice: Subject to any disclaimer, the term of this
patent is extended or adjusted under 35
U.S.C. 154(b) by 1530 days.

(21) Appl. No.: 15/419,199

(22) Filed: Jan. 30, 2017

(65) Prior Publication Data

US 2017/0226860 A1 Aug. 10, 2017

(30) Foreign Application Priority Data

Feb. 5, 2016 (DE) .......................... 102016201764.0

(51) Int. Cl.
*F01D 5/00* (2006.01)
*B23K 1/00* (2006.01)
(Continued)

(52) U.S. Cl.
CPC ............ *F01D 5/005* (2013.01); *B23K 1/0018*
(2013.01); *B23K 20/026* (2013.01);
(Continued)

(58) Field of Classification Search
CPC .... F01D 5/005; F01D 9/041; F05D 2220/323;
F05D 2230/18; F05D 2230/80; F05D
2240/12; B23P 6/002
See application file for complete search history.

(56) References Cited

U.S. PATENT DOCUMENTS 5,285,572 A 2/1994 Rathi et al.
5,913,555 A 6/1999 Richter et al.
(Continued)

FOREIGN PATENT DOCUMENTS

DE 19922012 C1 10/2000
DE 10055505 A1 5/2002
(Continued)

OTHER PUBLICATIONS

Bremer C: "Kompressor—Und Turbinenschaufeln Automatisch
Reparieren", Werkstatt + Betrieb, Carl Hanser Verlag Muenchen,
DE, col. 129, No. 7/08, Aug. 1, 1996, pp. 672-674.
(Continued)

*Primary Examiner* — Sarang Afzali
(74) *Attorney, Agent, or Firm* — Hinckley, Allen &
Snyder, LLP; David R. Josephs

(57) ABSTRACT

Disclosed is a repair method for guide blades of a gas
turbine. The method comprises:
providing at least one guide blade to be maintained;
capturing the actual geometry of the guide blade to be
maintained with application of at least one measuring
method;
comparing the actual geometry captured by the contactless
measuring method to a predetermined desired geometry for
a corresponding guide blade type;
calculating a target geometry for the guide blade to be
maintained, which corresponds as much as possible to the
desired geometry, such that using optimization parameters,
the desired geometry of the guide blade to be maintained is
approximated at least in sections along its flow contour;
applying material and removing material by machine on the
guide blade, such that the calculated target geometry is
produced.

19 Claims, 4 Drawing Sheets

(51) Int. Cl.

| | | |
|---|---|---|
| *B23K 20/02* | (2006.01) |
| *B23K 20/233* | (2006.01) |
| *B23K 31/02* | (2006.01) |
| *B23P 6/00* | (2006.01) |
| *F01D 5/14* | (2006.01) |
| *F01D 9/04* | (2006.01) |
| *B23K 101/00* | (2006.01) |

(52) U.S. Cl.
CPC ............ *B23K 20/233* (2013.01); *B23K 31/02* (2013.01); *B23P 6/002* (2013.01); *B23P 6/007* (2013.01); *F01D 5/141* (2013.01); *F01D 9/041* (2013.01); *B23K 2101/001* (2018.08); *F05D 2220/323* (2013.01); *F05D 2230/10* (2013.01); *F05D 2230/18* (2013.01); *F05D 2230/30* (2013.01); *F05D 2230/80* (2013.01); *F05D 2240/12* (2013.01); *Y02T 50/60* (2013.01)

(56) References Cited

U.S. PATENT DOCUMENTS

| | | | |
|---|---|---|---|
| 6,542,843 B1 | 4/2003 | Metzinger et al. | |
| 6,543,134 B2* | 4/2003 | Meier ..................... | B23P 6/007 |
| | | | 29/889.1 |
| 6,915,236 B2 | 7/2005 | Tanner et al. | |
| 6,919,956 B2 | 7/2005 | Kitagawa et al. | |
| 7,699,944 B2* | 4/2010 | Hu ........................ | C22C 19/056 |
| | | | 148/428 |
| 7,797,828 B2* | 9/2010 | Beeson ................... | B23P 6/007 |
| | | | 29/888 |
| 8,034,154 B2* | 10/2011 | Singer ................ | B23K 35/3053 |
| | | | 75/255 |
| 8,996,156 B2 | 3/2015 | Melzer-Jokisch et al. | |
| 2002/0091457 A1 | 7/2002 | Kadono | |
| 2002/0091459 A1 | 7/2002 | Meier | |
| 2002/0100793 A1* | 8/2002 | Fried .................... | B23K 1/0018 |
| | | | 228/119 |
| 2002/0128790 A1* | 9/2002 | Woodmansee .......... | B23P 6/002 |
| | | | 702/81 |
| 2003/0177640 A1 | 9/2003 | Marques et al. | |
| 2006/0078422 A1 | 4/2006 | Morris et al. | |
| 2007/0163684 A1 | 7/2007 | Hu | |
| 2009/0313823 A1 | 12/2009 | Rockstroch et al. | |
| 2013/0202427 A1 | 8/2013 | Macelroy | |

FOREIGN PATENT DOCUMENTS

| | | |
|---|---|---|
| DE | 112009001506 T5 | 4/2010 |
| EP | 1207004 A2 | 5/2002 |
| EP | 1348833 A1 | 10/2003 |
| EP | 2623720 A2 | 8/2013 |
| WO | 2012085172 A1 | 6/2012 |

OTHER PUBLICATIONS

Claus Bremer, BCT GmbH, presentation "Automated Repair and Overhaul System for Aero Turbine Engine Components", 2003.
Technical paper by Jones, J. et al., "Remanufacture of turbine blades by laser cladding, machining and in-process scanning in a single machine", Aug. 2012.

* cited by examiner

REPAIR METHOD FOR TURBINE BLADES

CROSS-REFERENCE TO RELATED APPLICATIONS

The present application claims priority under 35 U.S.C. §119 of German Patent Application No. 102016201764.0, filed. Feb. 5, 2016, the entire disclosure of which is expressly incorporated by reference herein.

BACKGROUND OF THE INVENTION

1. Field of the Invention

The present invention relates to a repair method for guide blades of a gas turbine, in particular an aircraft gas turbine.

2. Discussion of Background Information

Turbine blades are subject to high stresses in the operation of gas turbines, in particular aircraft gas turbines. These stresses result in three-dimensional shape deviations on the turbine blades and in damage, which makes regular maintenance and/or repair necessary. In this case, damage is repaired by soldering or welding, wherein subsequently a removal of an excessive amount of applied material is performed in manual work (grinding), to bring the turbine blade back into a usage-ready shape. The manual removal of material has the result, however, that the repaired turbine blades do not have a shape or contour which is optimum for operation, which has particularly negative effects especially in the relevant region of the A4 cross section, so that power losses of the gas turbine result therefrom. As a consequence, increased fuel consumption and $CO_2$ emissions result, as well as reduced runtimes due to increased wear of the turbines until the next required general overhaul.

In view of the foregoing, it would be advantageous to have available a method in which the above disadvantages can be reduced or even avoided.

SUMMARY OF THE INVENTION

The present invention provides a repair method for guide blades of a gas turbine, in particular an aircraft gas turbine. The method comprises:

providing at least one guide blade to be maintained;

capturing the actual geometry of the guide blade to be maintained with application of at least one (preferably contactless) measuring method;

comparing the actual geometry captured by the at least one measuring method to a predetermined desired geometry for a corresponding guide blade type;

calculating a target geometry for the guide blade to be maintained, which corresponds as much as possible to the desired geometry, such that using optimization parameters, the desired geometry of the guide blade to be maintained is approximated at least in sections along its flow contour;

applying material and removing material by machine on the guide blade to be maintained, such that the calculated target geometry is produced.

In one aspect of the method, the target geometry of the guide blade to be maintained may in such a way be calculated and reestablished in such a way that the flow contour in the region of the A4 cross section of the guide blade to be maintained approximates the flow contour of the desired geometry in the region of the A4 cross section as well as possible.

In another aspect of the method, the application and removal of the material may be performed along a suction side of the flow contour of the guide blade from a front edge up to a rear edge of the guide blade.

In yet another aspect, the removal of the material may be carried out by automated milling and/or grinding and/or by another automated cutting method and/or the application of material may be performed by soldering, for example, by diffusion soldering.

In a still further aspect of the method, the application of the material may be carried out as a function of captured actual geometry and of target geometry.

In another aspect, after application of material to the guide blade, a further calibration may be carried out to position the guide blade for removal of material.

In another aspect, the desired geometry may be an approximation to the original geometry of the guide blade. For example, in this case the desired geometry may be determined by a measuring method which is carried out on a guide blade in like-new condition.

In another aspect, the desired geometry may be the original geometry of the guide blade. For example, in this case the desired geometry may be derived from design data of a guide blade or may be defined based on a new development.

In another aspect of the method, the provided guide blade may be taken from a high-pressure turbine. For example, it may be taken from the first high-pressure turbine stage, which directly adjoins a combustion chamber.

In another aspect, the method steps may be carried out repeatedly until all guide blades of a guide blade ring of a turbine stage (e.g., a high pressure turbine stage) are repaired.

The present invention also provides a guide blade of a gas turbine, which guide blade has at least one repaired region that has been produced by the repair method set forth above.

The present invention also provides a repair system for maintaining turbine blades of a gas turbine, which system comprises at least one receptacle unit, which is configured to hold at least one turbine blade to be maintained;

at least one measuring device, which is configured to capture an actual geometry of the turbine blade to be maintained;

at least one automatic processing device, which is configured to apply material to the turbine blade to be maintained and/or to remove material, at least one computer unit, which is configured to control the measuring device and/or the processing device, store a desired geometry of a corresponding turbine type in an assigned memory, calculate a target geometry on the basis of optimization parameters and based on a comparison of actual geometry and desired geometry, control the processing device such that the target geometry of the turbine blade to be maintained is reestablished in at least one cross-sectional region with reference to the calculated optimization parameters.

In one aspect of the system, the at least one automatic processing device may comprise a milling unit and/or a grinding unit.

As set forth above, the proposed method comprises the following:

providing at least one guide blade (10, 10') to be maintained;

capturing the actual geometry of the guide blade (10, 10') to be maintained with application of at least one measuring method;

comparing the actual geometry captured by a (contactless) measuring method to a predetermined desired geometry (SG) for a corresponding guide blade type;

calculating a target geometry (ZG) for the guide blade (10, 10') to be maintained, which corresponds as much as possible to the desired geometry (SG), such that using optimization parameters, the desired geometry (SG) of the guide blade (10, 10') to be maintained is approximated at least in sections along its flow contour;

applying material (22) and removing material (22) by machine on the guide blade (10, 10') to be maintained, such that the calculated target geometry (ZG) is produced.

In the proposed method, the removal of material is to be performed in an automated manner and/or by machine with reference to the calculated optimization parameters. In this way, it can be ensured that the material removal can be performed so exactly, in particular in especially relevant regions of a flow contour of the guide blade and preferably also repeatedly for different guide blades, that the flow contour can be formed as optimally as possible for the further use of the repaired guide blade in the operation of a gas turbine, in particular an aircraft gas turbine.

It is preferable for the target geometry (ZG) of the guide blade in such a way (10, 10') to be maintained to be calculated and reestablished in such a way that in particular the flow contour in the region of the A4 cross section (QS) of the guide blade (10, 10') to be maintained approximates the flow contour of the desired geometry (SG) in the region of the A4 cross section as well as possible. The desired geometry of the guide blade to be maintained is thus to be reestablished in the region of its flow contour which forms the A4 cross section with the flow contour of an adjacent guide blade. The A4 cross section is located in this case approximately along a connecting line between a rear edge region of a pressure side of one guide blade and a central region of a suction side of the other guide blade. The A4 cross section relates to the narrowest cross section in the jet engine, which is typically located in the first turbine stage behind the combustion chamber. Especially in this region, it is particularly relevant that the distance between the adjacent guide blades, in particular the distance between the suction side of one guide blade and the pressure side of the other guide blade is set optimally. An enlargement of this distance results in worsened flow conditions and therefore worse efficiency of the gas turbine.

The application and removal of material can preferably be performed along a suction side of the flow contour of the guide blade from a front edge up to a rear edge of the guide blade. The removal of material can be carried out by automatic milling and/or grinding and/or by another automated cutting method.

As a refinement, it is proposed that the application of material be performed by soldering, in particular diffusion soldering.

The application of material can be performed automatically and/or manually. In the application of material, an absolutely exact quantity of material which is applied is not important, rather, it has to be ensured that the connection between the applied material and the main body of the guide blade is optimally produced, so that then the excess material can be automatically removed to reestablish the optimum flow contour.

Furthermore, the application of material can be carried out as a function of the captured actual geometry and of the desired geometry. In this case, calculated data for the application of material can be supplied to an automated soldering or welding device, which then applies corresponding material quantities to the corresponding points of the guide blade on the basis of this data. In the case of manual processing, points and material quantities to be applied can be provided, for example, in the form of a drawing on paper or displayed on a display screen to a person, who carries out the material application manually.

After the application of material to the guide blade, a further calibration is preferably carried out, in particular as an automated measuring method, to position the guide blade for the removal of the material. During this calibration, it can be ensured in particular that the guide blade to be repaired is arranged in a reference position with respect to a spatial coordinate system which is used for the automated removal of material. This reference position can be, for example, the same alignment or attitude of the guide blade in space as during the capture of the actual geometry before the step of the material application.

It is proposed that the desired geometry is an approximation to an original geometry or the original geometry of the guide blade. It is preferable in this case that the desired geometry, as an approximation to the original geometry, is determined by a measurement which is carried out on a guide blade in like-new condition. Alternatively, the desired geometry as the original geometry can be derived from design data of a guide blade. Furthermore, it is also possible to use design data which originate from a new development of a guide blade.

By way of the proposed methods for capturing the desired geometry, on the one hand, guide blades can be repaired which originate from a producer whose design data cannot be accessed. Such a guide blade can then be captured with its external contours, for example, by means of three-dimensional scanning (laser scanning or the like) or another imaging method, to determine a desired geometry therefrom. On the other hand, it is possible to repair guide blades of which one knows original design data.

The provided guide blade is preferably taken from a high-pressure turbine, in particular the first high-pressure turbine stage, which directly adjoins the combustion chamber. These guide blades of the first high-pressure turbine stage are subject to wear or deformation in operation to a particularly high extent as a result of the high pressure and the high temperatures prevailing after the combustion chamber.

The listed method steps can be carried out repeatedly until all guide blades of a guide blade ring of a turbine stage, in particular a high-pressure turbine stage, are repaired.

The invention furthermore provides a guide blade of a gas turbine, in particular an aircraft gas turbine, comprising at least one repaired region, which has been reestablished by the repair method as claimed in any one of the instant claims.

Finally, the invention also provides a repair system for maintaining turbine blades of a gas turbine, in particular an aircraft gas turbine, comprising at least one receptacle unit, which is configured to hold at least one turbine blade to be maintained;

at least one contactless scanning measuring device, which is configured to capture an actual geometry of the turbine blade to be maintained;

at least one automatic processing device, which is configured to apply material to the turbine blade to be maintained and/or to remove material, wherein the processing device preferably comprises a milling unit and/or a grinding unit;

at least one computer unit, which is configured to control the measuring device and/or the processing
      device, store a desired geometry of a corresponding turbine blade type in an assigned memory, calculate a desired geometry on the basis of optimization parameters and based on the comparison of actual geometry and desired geometry, control the processing device such that the desired geometry of the turbine blade to be maintained is reestablished in at least one cross-sectional region with reference to the calculated optimization parameters.

Such a repair system can be formed, for example, by various workstations or machine units, at which the various method steps are carried out and to which a guide blade to be repaired is supplied sequentially.

BRIEF DESCRIPTION OF THE DRAWINGS

The invention will be described hereafter by way of example and in a nonrestrictive manner with reference to the appended drawings.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
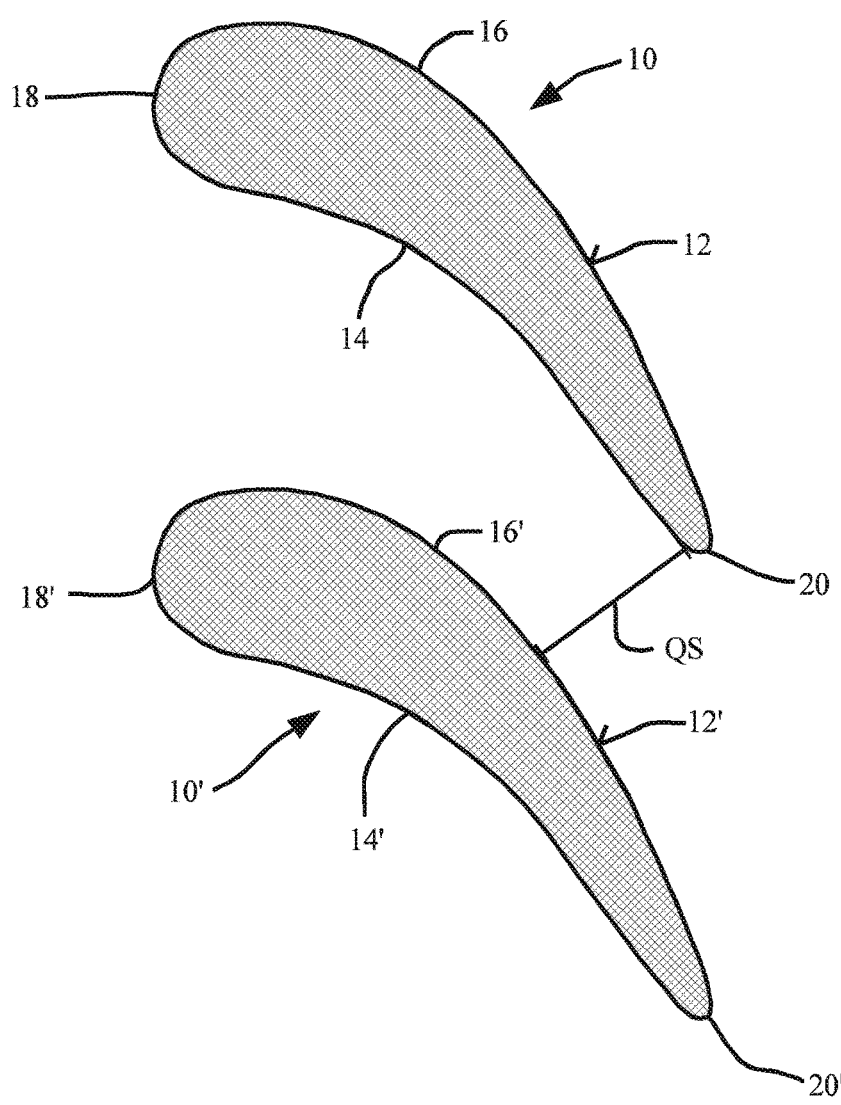
FIG. 1 shows a simplified schematic cross-sectional illustration of two guide blades of a guide blade ring, wherein the guide blades have an original flow contour.

FIG. 1 shows, by way of example, two turbine blades 10 and 10' arranged in the circumferential direction UR of a turbine stage. The turbine blades can be part of a guide blade ring and can be designed as guide blades 10, 10'. The guide blades 10, 10' are shown in FIG. 1 and also in the following Figures as simplified schematic cross sections. Both guide blades 10, 10' have a flow contour 12, 12', having a pressure side 14, 14' and a suction side 16, 16'. The pressure sides 14, 14' and the corresponding suction sides 16, 16' are each connected to one another by a front edge 18, 18' and a rear edge 20, 20'.

In the situation shown in FIG. 1 of two adjacent guide blades 10, 10' of a guide blade ring of a gas turbine, the so-called A4 cross section is formed in each case between all adjacent guide blades. This A4 cross section can also be referred to as the distance between two adjacent guide blades 10, 10', which is measured in a specific region. As is apparent from FIG. 1, the A4 cross section QS is measured between the pressure side 14 of the guide blade 10 and the suction side 16' of the guide blade 10'. In this case, the A4 cross section line QS extends from a rear region of the guide blades 10, approximately in the region of the rear edge 20, to a middle region of the suction side 16' of the guide blade 10'. This A4 cross section represents an important variable for the flow conditions prevailing in the turbine stage. Deviations from this A4 cross section result in changed flow conditions and can negatively influence the efficiency of the gas turbine.

In FIG. 1, the crossed shading shows two guide blades 10, 10', the flow contour 12, 12' of which is shown in an original state. One can also say that the two guide blades 10, 10' are in like-new condition. The A4 cross section QS or the corresponding distance between the two guide blades is also in an original dimension because of the like-new condition of the guide blades 10, 10', so that optimum operation is possible.

Figure 2:
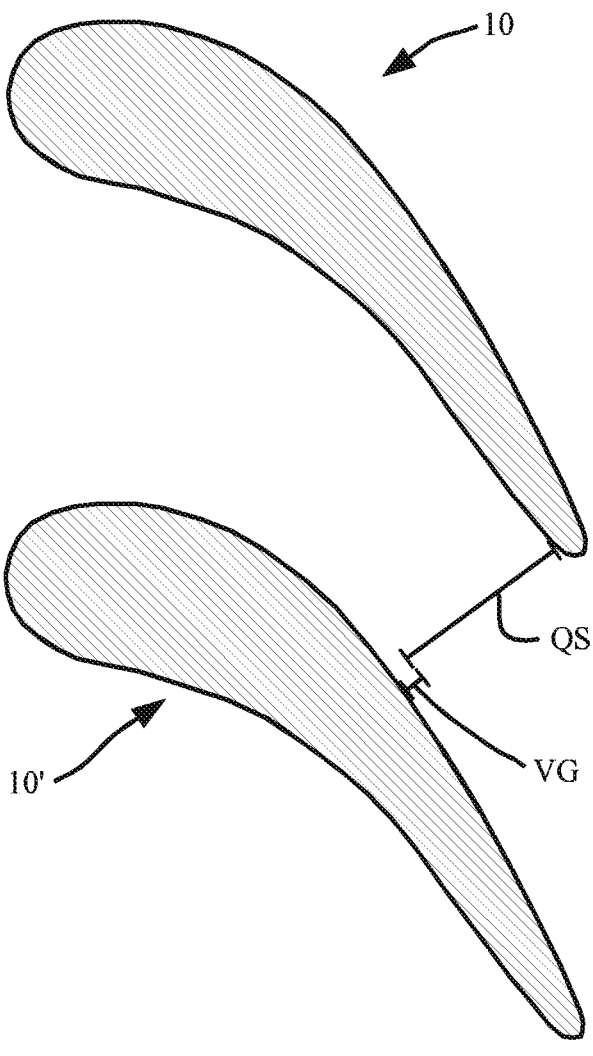
FIG. 2 shows a simplified schematic cross-sectional illustration of two guide blades of a guide blade ring, wherein the guide blades have a worn flow contour.

After a certain number of operating hours, changes arise on the flow contour 12, 12' on the guide blades 10, 10' as a result of the high temperatures and the high pressure of the hot gas flowing through. For example, material is also successively eroded away on the suction side 16, 16' or other damage also occurs, such as cracks or holes. The A4 cross section QS changes due to such wear of the guide blades 10, 10', wherein it is enlarged by an amount VG. In the state shown in FIG. 2, the A4 cross section is thus QS plus VG, so that the flow cross section between the two guide blades 10, 10' is enlarged, which has a disadvantageous effect on the flow conditions and the efficiency of the gas turbine. Components in which such wear occurs have to be restored or repaired accordingly for further operation.

Figure 3:
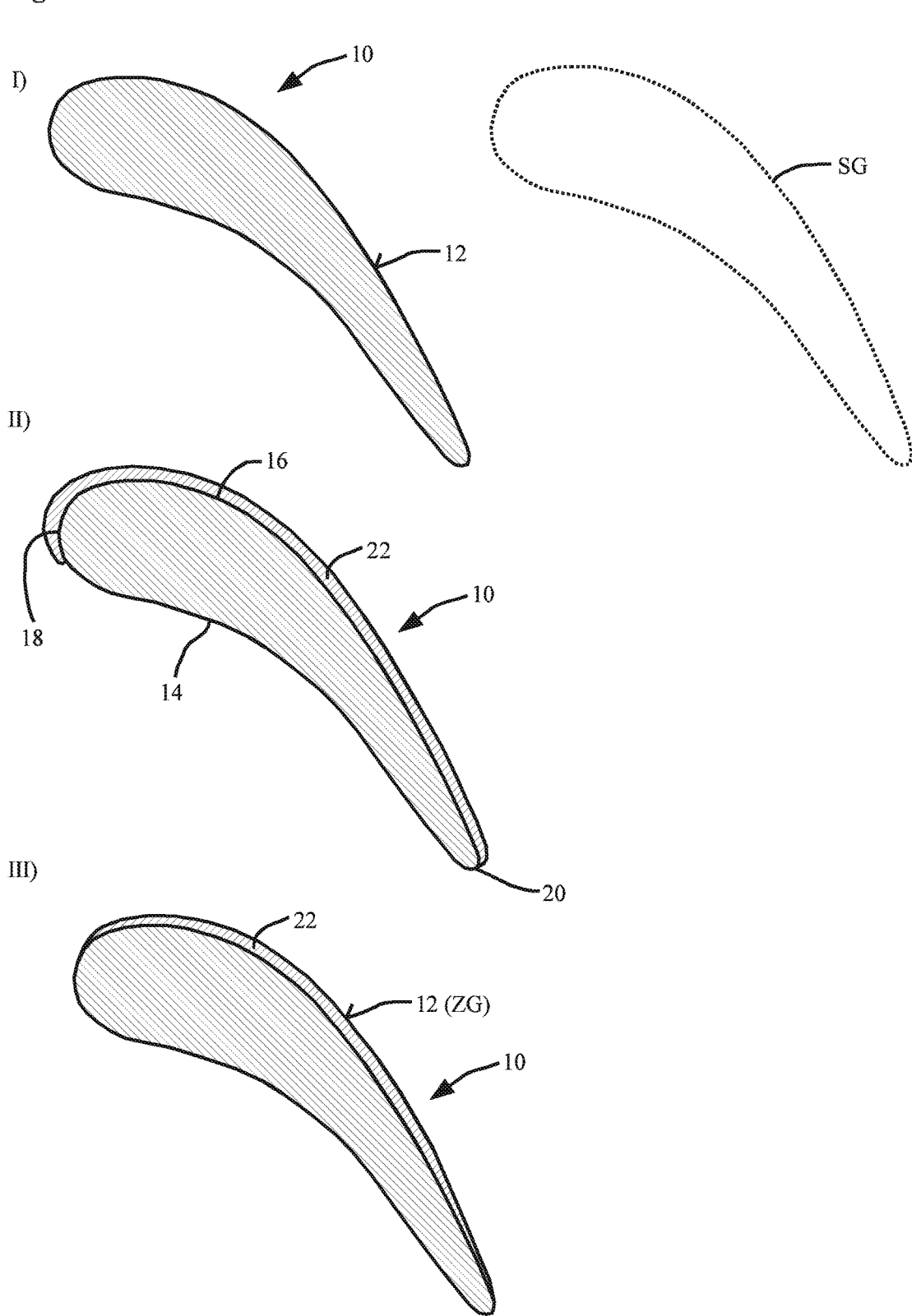
FIG. 3 shows, on the basis of simplified schematic cross-sectional illustrations, the steps of a method for repairing guide blades to be repaired from FIG. 2.

A method which is explained hereafter on the basis of FIG. 3 can be used for this purpose. The following description only mentions the guide blade 10 by way of example in each case, although the method can also be carried out for the adjacent guide blade 10' and further guide blades. The guide blade 10 or all guide blades of a turbine stage are firstly provided. Depending on the construction of a turbine stage, the guide blades can be provided individually, or multiple guide blades can be part of a guide blade segment, which has multiple guide blades connected to one another, in particular integrally.

An actual geometry of the worn guide blade 10, which is shown on the top left in FIG. 3, is firstly captured (I) by means of a contactless method, in particular an optical method. Methods such as contactless 3D scanning or the like can be used in particular here. This actual geometry, which is represented in the present application by the flow contour 12, is compared to a desired geometry. The desired geometry SG is indicated in simplified and schematic form on the top right in FIG. 3 as a dotted flow contour. Target geometries can be calculated from the comparison between the actual geometry and the desired geometry SG by means of optimization parameters, which approximate the flow contour, in the region of the A4 cross section, in the best possible manner to the desired geometry.

In a next step (II), material 22 is applied to the guide blade 10. In the present example, an application of material 22 from the front edge 18 to the rear edge 20 along the suction side 16 is shown. Of course, material 22 can optionally also be applied to the pressure side 14, although this is not explicitly described in the present example. The application of material 22 is performed in particular by soldering or welding, preferably by diffusion soldering, to ensure an optimum connection between the application material 22 and the guide blade 10 to be restored. The application of material 22 can be performed manually and/or automatically. The quantity and/or the positions along the guide blade or the flow contour 12 can be established, for example, on the basis of the optimization parameters, which have been previously ascertained on the basis of the comparison of actual geometry and desired geometry.

After the application of material 22, the flow contour 12 (target geometry ZG) of the guide blade 10 to be repaired is reestablished by automatic removal of excess material 22 (see III). The guide blade 10 is moved for this purpose into a reference position in relation to a processing unit. The processing unit is configured in this case to carry out an exact removal of material 22 based on the optimization parameters or data about the desired geometry to be achieved. The removal of material 22 is preferably performed in this case by grinding or milling. After the removal by cutting of excess material 22, the guide blade 10 has a flow contour 12 which substantially again corresponds to the desired geometry, wherein the guide blade 10 contains a part made of original material and a part made of additionally applied material 22.

Figure 4:
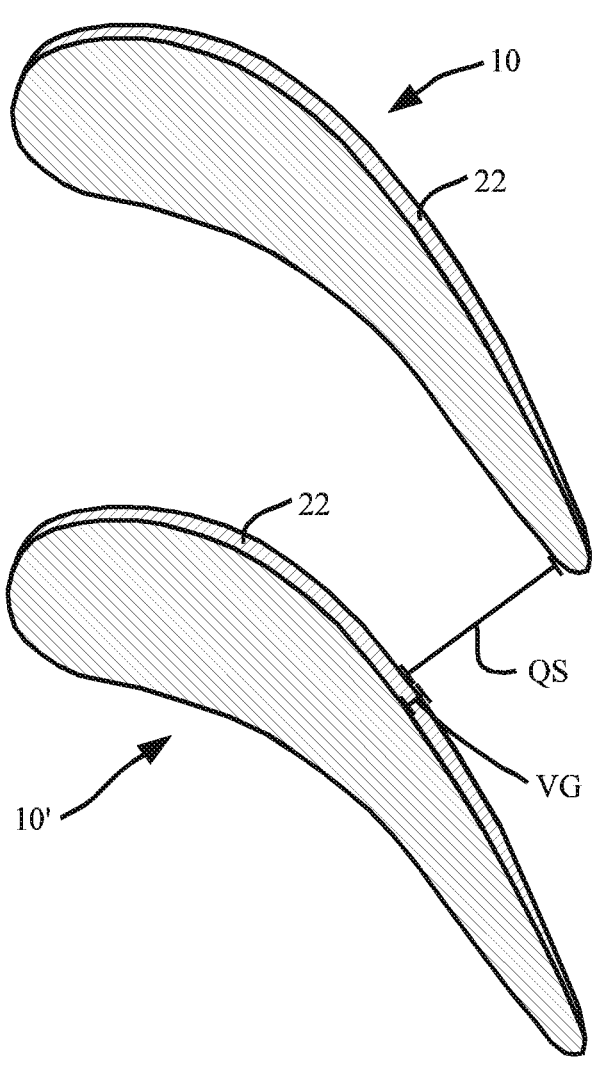
FIG. 4 shows a simplified schematic cross-sectional illustration of two guide blades of a guide blade ring, wherein the guide blades are repaired and have a flow contour which corresponds to an optimized desired geometry.

If one observes two adjacent repaired guide blades 10, 10' after such a repair method carried out substantially automatically, as shown in FIG. 4, it is apparent that the A4 cross section QS substantially again corresponds to the original A4 cross section QS and the original flow contour (FIG. 1). The enlargement VG of the flow cross section (FIG. 2) was therefore canceled out by the application of material 22 in the corresponding regions of the guide blades 10, 10', so that optimum operation of the gas turbine is again possible using the repaired guide blades 10, 10'.

It is to be noted that individual optimization parameters can be calculated based on the capture of the actual geometry for each guide blade, which parameters are dependent on the wear state which the corresponding guide blade to be restored has reached. Because the further steps of the repair can preferably be made dependent on the actual geometry, it can be ensured that the required material application and an automated material removal can be performed in a manner optimized for each guide blade, and the desired geometry can be reestablished for each guide blade. The automated processing also results in an overall improved result for all repaired or restored guide blades if repaired guide blades are compared to one another, because approximately the same desired geometry is reestablished for all guide blades and all guide blades can be substantially automatically processed on the basis of calculated optimization parameters.

The method proposed here can be carried out, for example, at various stations of a maintenance workshop. In the performance of automated steps, for example the detection of the actual geometry, the comparison of actual geometry and desired geometry, the calculation of optimization parameters, the automated removal of applied material, at least one computer unit is preferably used, which is configured to control corresponding capture devices or tool devices, in particular based on the captured or calculated data for the desired geometry.

Data which represent the desired geometry of a guide blade can be captured, for example, in that the geometry of a guide blade in like-new condition is externally captured by means of corresponding capture devices, for example by contactless 3D scanning, in particular optical capture methods. Alternatively, the data of the desired geometry can also be derived from design data, which are available for a specific guide blade type and which form the basis for producing a guide blade in like-new condition.

LIST OF REFERENCE NUMERALS

10 turbine blade or guide blade
12 flow contour

14 pressure side
16 suction side
18 front edge
20 rear edge
22 material
QS A4 cross section
DG desired geometry
VG enlargement

What is claimed is:

1. A method for repairing worn guide blades of a gas turbine, the method consisting of the steps of:

providing at least one worn guide blade to be repaired; the at least one worn guide blade having an original state with an original geometry prior to use in the gas turbine and an actual worn state after use in the gas turbine;

capturing a desired geometry of the at least one worn guide blade; the desired geometry being an approximation of the original geometry;

capturing an actual geometry of the at least one worn guide blade to be repaired in the actual worn state prior to any subsequent processing of the at least one worn guide blade using at least one contactless measuring method;

comparing the actual geometry of the at least one worn guide blade captured by the at least one contactless measuring method to the desired geometry for a corresponding guide blade type;

calculating a target geometry for the at least one worn guide blade to be repaired, which corresponds as closely as possible to the desired geometry, such that using optimization parameters, the desired geometry of the at least one worn guide blade to be repaired is approximated at least in sections along its flow contour;

applying material on the at least one worn guide blade to be repaired and subsequently removing excess applied material by machine, such that the calculated target geometry is produced to provide an at least one repaired guide blade;

the target geometry of the at least one worn guide blade to be repaired being calculated and reestablished wherein a flow contour in a region of an A4 cross section of the at least one repaired guide blade approximates a flow contour of the desired geometry in the region of the A4 cross section, the A4 cross section being located along a connecting line between a rear edge region of a pressure side of a first guide blade and a central region of a suction side of an adjacent second guide blade.

2. The method for repairing worn guide blades of a gas turbine of claim 1, wherein application and removal of material are performed along a suction side of a flow contour of the at least one worn guide blade from a front edge up to a rear edge of the guide blade.

3. The method for repairing worn guide blades of a gas turbine of claim 1, wherein removal of excess applied material is carried out by automated milling and/or grinding.

4. The method for repairing worn guide blades of a gas turbine of claim 1, wherein application of material is performed by soldering.

5. The method for repairing worn guide blades of a gas turbine of claim 4, wherein application of material is performed by diffusion soldering.

6. The method for repairing worn guide blades of a gas turbine of claim 1, wherein application of material is carried out as a function of the actual geometry and the target geometry.

7. The method for repairing worn guide blades of a gas turbine of claim 1, wherein after application of material to the at least one guide blade, a further calibration is carried out to position the at least one guide blade for removal of excess applied material.

8. The method for repairing worn guide blades of a gas turbine of claim 1, wherein the desired geometry is an approximation to a geometry of the guide blade in like-new condition.

9. The method for repairing worn guide blades of a gas turbine of claim 1, wherein the desired geometry is a geometry of the guide blade in like-new condition.

10. The method for repairing worn guide blades of a gas turbine of claim 8, wherein the desired geometry is determined by a measuring method which is carried out on a guide blade in like-new condition.

11. The method for repairing worn guide blades of a gas turbine of claim 9, wherein the desired geometry is derived from design data of a guide blade.

12. The method for repairing worn guide blades of a gas turbine of claim 1, wherein the provided guide blade is taken from a high-pressure turbine.

13. The method for repairing worn guide blades of a gas turbine of claim 1, wherein the at least one worn guide blade is taken from a first high-pressure turbine stage, which directly adjoins a combustion chamber.

14. The method for repairing worn guide blades of a gas turbine of claim 1, wherein the steps of the method are carried out repeatedly until all guide blades of a guide blade ring of a turbine stage are repaired.

15. The method for repairing worn guide blades of a gas turbine of claim 14, wherein the turbine stage is a high pressure turbine stage.

16. The method for repairing worn guide blades of a gas turbine of claim 1, wherein the method is carried out by using a repair system for worn turbine blades of a gas turbine, which the system comprises;

at least one receptacle unit, which is configured to hold the at least one worn turbine blade to be repaired;

at least one contactless measuring device, which is configured to capture the geometry of the worn turbine blade to be repaired;

at least one automatic processing device, which is configured to apply the material to the worn turbine blade to be repaired and to remove excess applied material;

at least one computer unit, which is configured to control the measuring device and/or the processing device, store a corresponding turbine type of the desired geometry in an assigned memory, calculate the target geometry on the basis of optimization parameters and based on the comparison of the actual geometry and the desired geometry, and control the processing device such that the target geometry of the worn turbine blade to be repaired is reestablished in at least the A4 cross section with reference to the calculated optimization parameters.

17. The method for repairing worn guide blades of a gas turbine of claim 1, wherein the at least one worn guide blade is a part of a guide blade segment or ring that has multiple guide blades connected to one another.

18. The method for repairing worn guide blades of a gas turbine of claim 17, wherein the multiple guide blades are integrally connected to each other.

19. The method for repairing worn guide blades of a gas turbine of claim 17, wherein individual optimization parameters are calculated based on a capture of an actual geometry for each guide blade of the guide blade segment or ring.

* * * * *